US011130483B2

(12) United States Patent
Jung

(10) Patent No.: US 11,130,483 B2
(45) Date of Patent: Sep. 28, 2021

(54) SYSTEM AND METHOD FOR CONTROLLING TURNING OF VEHICLE

(71) Applicants: Hyundai Motor Company, Seoul (KR); Kia Motors Corporation, Seoul (KR)

(72) Inventor: Dae Suk Jung, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 240 days.

(21) Appl. No.: 16/380,354

(22) Filed: Apr. 10, 2019

(65) Prior Publication Data

US 2020/0180590 A1 Jun. 11, 2020

(30) Foreign Application Priority Data

Dec. 7, 2018 (KR) .................... 10-2018-0156816

(51) Int. Cl.
*B60W 10/20* (2006.01)
*B60W 10/184* (2012.01)
*B62D 6/00* (2006.01)

(52) U.S. Cl.
CPC .......... *B60W 10/20* (2013.01); *B60W 10/184* (2013.01); *B62D 6/002* (2013.01); *B60W 2540/18* (2013.01)

(58) Field of Classification Search
CPC ............... B60W 10/20; B60W 10/184; B60W 2540/18; B62D 6/002
See application file for complete search history.

(56) References Cited

U.S. PATENT DOCUMENTS

| 7,318,629 B1 * | 1/2008 | Sun ..................... B60W 10/11 303/146 |
| 7,712,845 B2 | 5/2010 | Mackovjak et al. |
| 2002/0066616 A1 * | 6/2002 | Wessman .............. B62D 11/08 180/446 |

(Continued)

FOREIGN PATENT DOCUMENTS

| DE | 10 2017 107 603 A1 | 10/2018 |
| JP | 2006-103517 A | 4/2006 |

(Continued)

*Primary Examiner* — Peter D Nolan
*Assistant Examiner* — Mikko Okechukwu Obioha
(74) *Attorney, Agent, or Firm* — Morgan Lewis & Bockius LLP

(57) ABSTRACT

A system for controlling turning of vehicle may include a steering angle detection sensor; a front inner wheel speed detection sensor detecting a front inner wheel speed; a front outer wheel speed detection sensor detecting a front outer wheel speed; a rear outer wheel speed detection sensor detecting a rear outer wheel speed based on a turning direction; and a braking controller receiving detection signal of the steering angle detection sensor to determine that the vehicle turns, estimating the rear inner wheel speed in the turning direction based on detection signals of the front inner wheel speed detection sensor and the front outer wheel speed detection sensor and detection signal of the rear outer wheel speed detection sensor, and executing a mode for decreasing the estimated speed as compared to the rear outer wheel speed, as a control mode for reducing a minimum rotation radius at the time of turning.

11 Claims, 5 Drawing Sheets

(56) References Cited

U.S. PATENT DOCUMENTS

| | | | | |
|---|---|---|---|---|
| 2003/0167116 A1* | 9/2003 | Erban | ............... | B60T 8/885 |
| | | | | 701/74 |
| 2005/0206231 A1 | 9/2005 | Lu et al. | | |
| 2005/0240332 A1* | 10/2005 | Mori | ............... | B60T 8/1755 |
| | | | | 701/72 |
| 2012/0316733 A1* | 12/2012 | Futamura | ............ | B60T 8/1755 |
| | | | | 701/42 |
| 2018/0201312 A1* | 7/2018 | Smith | ............... | B62D 11/08 |
| 2019/0241163 A1* | 8/2019 | Sakaguchi | ............ | B60T 8/321 |
| 2020/0070833 A1* | 3/2020 | Suzuki | ............... | B62D 11/24 |

FOREIGN PATENT DOCUMENTS

| | | |
|---|---|---|
| JP | 2009-012632 A | 1/2009 |
| JP | 2009-012717 A | 1/2009 |
| JP | 2009-056949 A | 3/2009 |
| KR | 10-2008-0010142 A | 1/2008 |
| KR | 10-2013-0020014 A | 2/2013 |
| KR | 10-2015-0031879 A | 3/2015 |
| KR | 10-2018-0024475 A | 3/2018 |

* cited by examiner

SYSTEM AND METHOD FOR CONTROLLING TURNING OF VEHICLE

CROSS-REFERENCE TO RELATED APPLICATION

The present application claims priority to Korean Patent Application No. 10-2018-0156816 filed on Dec. 7, 2018, the entire contents of which is incorporated herein for all purposes by this reference.

BACKGROUND OF THE INVENTION

Field of the Invention

The present invention relates to a system and method for controlling turning of a vehicle, and more particularly, to a system and method for controlling turning of a vehicle, which are capable of reducing a minimum rotation radius, by generating rotation moment of the vehicle through speed control of a rear internal tire in a turning direction at the time of turning.

Description of Related Art

As is well-known, a high-performance vehicle has a tire having a larger diameter and width than a general vehicle, to improve driving performance and braking performance of the vehicle.

When the diameter and width of the tire increase, the sizes of a fender panel and a wheel guard of a vehicle body adjacent to the tire increase, preventing interference with the tire.

However, when the sizes of the fender panel and the wheel guard increase, design and manufacturing costs may increase due to change of the structure of the vehicle body. Therefore, to use the unchanged basic vehicle body and to prevent interference with the tire at the time of full turn, a method of reducing the stroke of a rack of a steering (the stroke of a rack as a portion for steering the tire) is being applied.

However, when the stroke of the rack of the steering is reduced, since a minimum rotation radius increases at the time of turning, the marketability of the vehicle may deteriorate.

To increase the minimum rotation radius of the vehicle, a variable rack stroke (VRS) system for increasing the rotation angle of a front tire to reduce a minimum rotation radius or a rear wheel steering (RWS) system for rotating a rear wheel by a predetermined angle to reduce a minimum rotation radius is being applied to the vehicle. However, in the instant case, the number of parts, weight and cost may increase.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for controlling turning of a vehicle, which are configured for reducing a minimum rotation radius, by generating rotation moment of the vehicle through speed control of a rear internal tire in a turning direction when the vehicle turns, without using the existing variable rack stroke system or the existing rear wheel steering.

In one aspect, a system for controlling turning of a vehicle may include a steering angle detection sensor, a front internal wheel speed detection sensor configured to detect a front internal wheel speed, a front external wheel speed detection sensor configured to detect a front external wheel speed, a rear external wheel speed detection sensor configured to detect a rear external wheel speed based on a turning direction thereof, and a braking controller configured to receive a detection signal of the steering angle detection sensor to determine that the vehicle turns, to estimate the rear internal wheel speed in the turning direction based on detection signals of the front internal wheel speed detection sensor and the front external wheel speed detection sensor and a detection signal of the rear external wheel speed detection sensor, and to execute a mode for decreasing the estimated speed as compared to the rear external wheel speed, as a control mode for reducing a minimum rotation radius at the time of turning.

In an exemplary embodiment of the present invention, the braking controller may be connected to an input switch operable by a user to transmit a signal, and the control mode for reducing the minimum rotation radius of the braking controller may be executed when the input switch is turned on.

In another exemplary embodiment of the present invention, the braking controller may be configured to control decrease of the rear internal wheel speed, by multiplying a gain value of the rear internal wheel speed in the turning direction by a steering-angle gain value indicating a compensation amount of each steering angle and a friction-coefficient gain value indicating a compensation amount of each road surface condition and a steering-angle gain value indicating a compensation amount of each steering angle.

In another aspect, a method of controlling turning of a vehicle may include a braking controller receiving a detection signal of a steering angle detection sensor configured to determine whether a current steering angle exceeds a reference steering angle for reducing a minimum rotation radius, the braking controller determining that a current vehicle speed is less than a reference speed for reducing the minimum rotation radius, when the current steering angle exceeds the reference steering angle, and estimating a rear internal wheel speed in a turning direction based on detection signals of a front internal wheel speed detection sensor and a front external wheel speed detection sensor and a detection signal of a rear external wheel speed detection sensor and then controlling decrease of the estimated speed as compared to the rear external wheel speed, when the current vehicle speed is less than the reference speed.

In an exemplary embodiment of the present invention, in the determining of whether the current vehicle speed is less than the reference speed for reducing the minimum rotation radius, the current vehicle speed may be obtained by a speed detection signal detected by one of the front internal wheel speed detection sensor, the front external wheel speed detection sensor and the rear external wheel speed detection sensor.

In another exemplary embodiment of the present invention, when the braking controller estimates the rear internal wheel speed and then controls decrease of the estimated speed as compared to the rear external wheel speed, decrease of the rear internal wheel speed may be controlled by multiplying a gain value of the rear internal wheel speed in the turning direction by a steering-angle gain value indicating a compensation amount of each steering angle and a friction-coefficient gain value indicating a compensation amount of each road surface condition.

In yet another exemplary embodiment of the present invention, the braking controller may be configured to control decrease of the rear internal wheel speed in the turning direction to a speed determined by multiplying the estimated rear internal wheel speed by (1−gain).

In yet another exemplary embodiment of the present invention, the controlling of decrease of the rear internal wheel speed in the turning direction may include the braking controller configured for controlling brake fluid pressure applied to a braking wheel cylinder mounted in a rear internal wheel.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
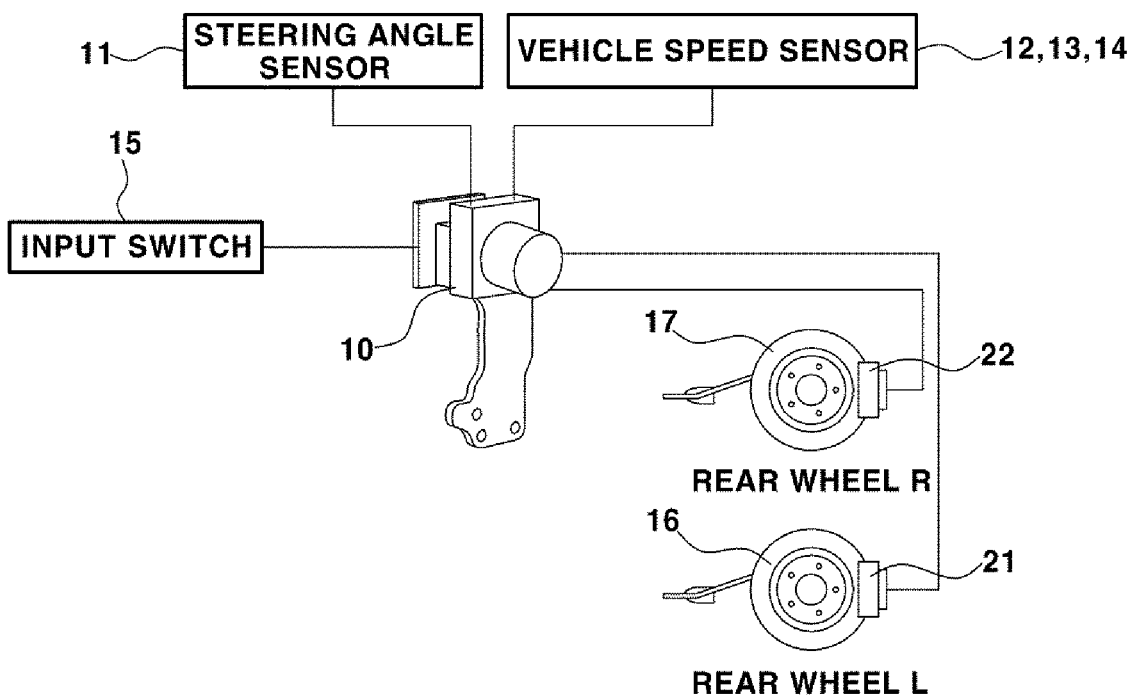
FIG. 1 is a view exemplarily illustrating the configuration of a system for controlling turning of a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, the exemplary embodiments of the present invention will be described in detail with reference to the accompanying drawings to allow those skilled in the art to easily practice the exemplary embodiments.

FIG. 1 is a view exemplarily illustrating the configuration of a system for controlling turning of a vehicle according to an exemplary embodiment of the present invention. Reference numeral 10 denotes a braking controller.

As the braking controller, a controller of an electronic stability control (ESC) system for selectively controlling brake fluid pressure of each wheel may be used and provided as a separate controller.

A steering angle detection sensor 11 for detecting a steering angle of the vehicle, a front internal wheel speed detection sensor 12 for detecting a front internal wheel speed as a sensor for detecting a vehicle speed, a front external wheel speed detection sensor 13 for detecting a front external wheel speed, and a rear external wheel speed detection sensor 14 for detecting a rear external wheel speed in a turning direction thereof, all of which may transmit signals, are connected to an input terminal of the braking controller 10.

A wheel cylinder 21 of a rear left wheel and a wheel cylinder 22 of a rear right wheel are connected to an output terminal of the braking controller 10, and the brake fluid pressure of the wheel cylinders 21 and 22 may be controlled under control of the braking controller 10.

For reference, the wheel cylinders 21 and 22 are hydraulic cylinders for braking and are mounted in the rear left and right wheels 16 and 17.

At the instant time, the rear left wheel 16 is a rear internal wheel in the left turning direction of the wheel and the rear right wheel 17 is a rear right wheel in the right turning direction of the wheel.

Meanwhile, an input switch 15 configured for being operated by a user to transmit a signal is connected to an input terminal of the braking controller 10. When the input switch 15 is turned on, the braking controller 10 executes a control mode for reducing a minimum rotation radius when the vehicle turns.

The input switch 15 includes a button type switch or a touch switch displayed on a touchscreen of an audio visual navigation (AVN) system.

A method of controlling turning of a vehicle according to an exemplary embodiment of the present invention based on the above configuration will now be described.

Figure 2:
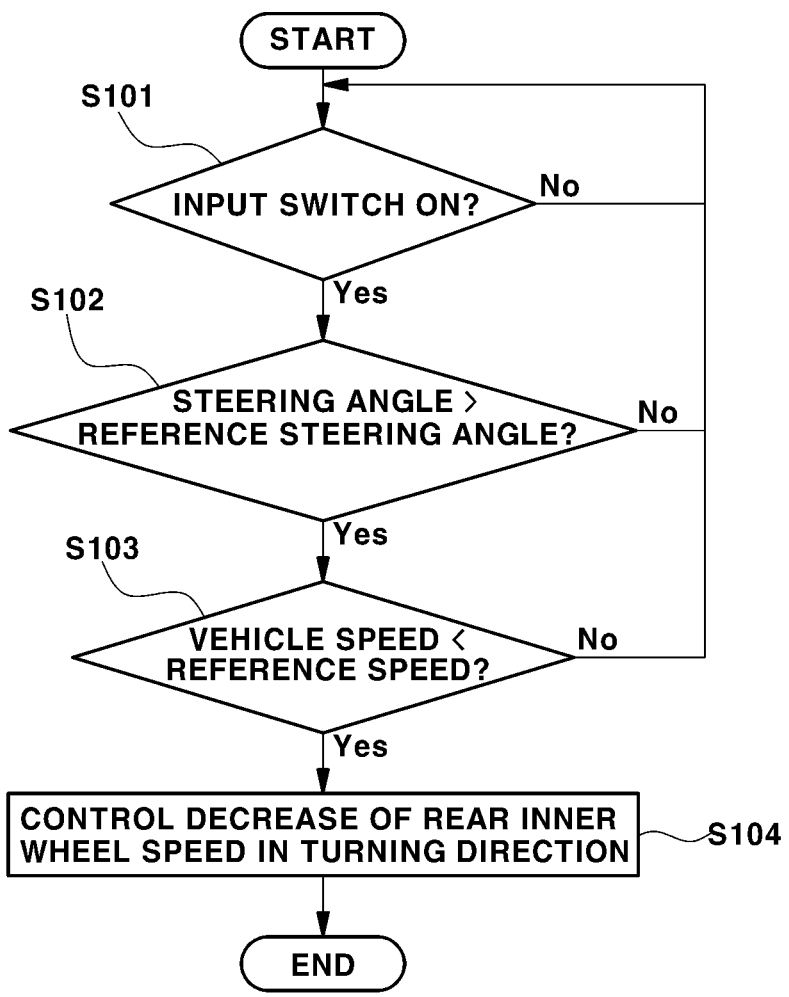
FIG. 2 is a flowchart illustrating a method of controlling turning of a vehicle according to an exemplary embodiment of the present invention.
Figure 3:
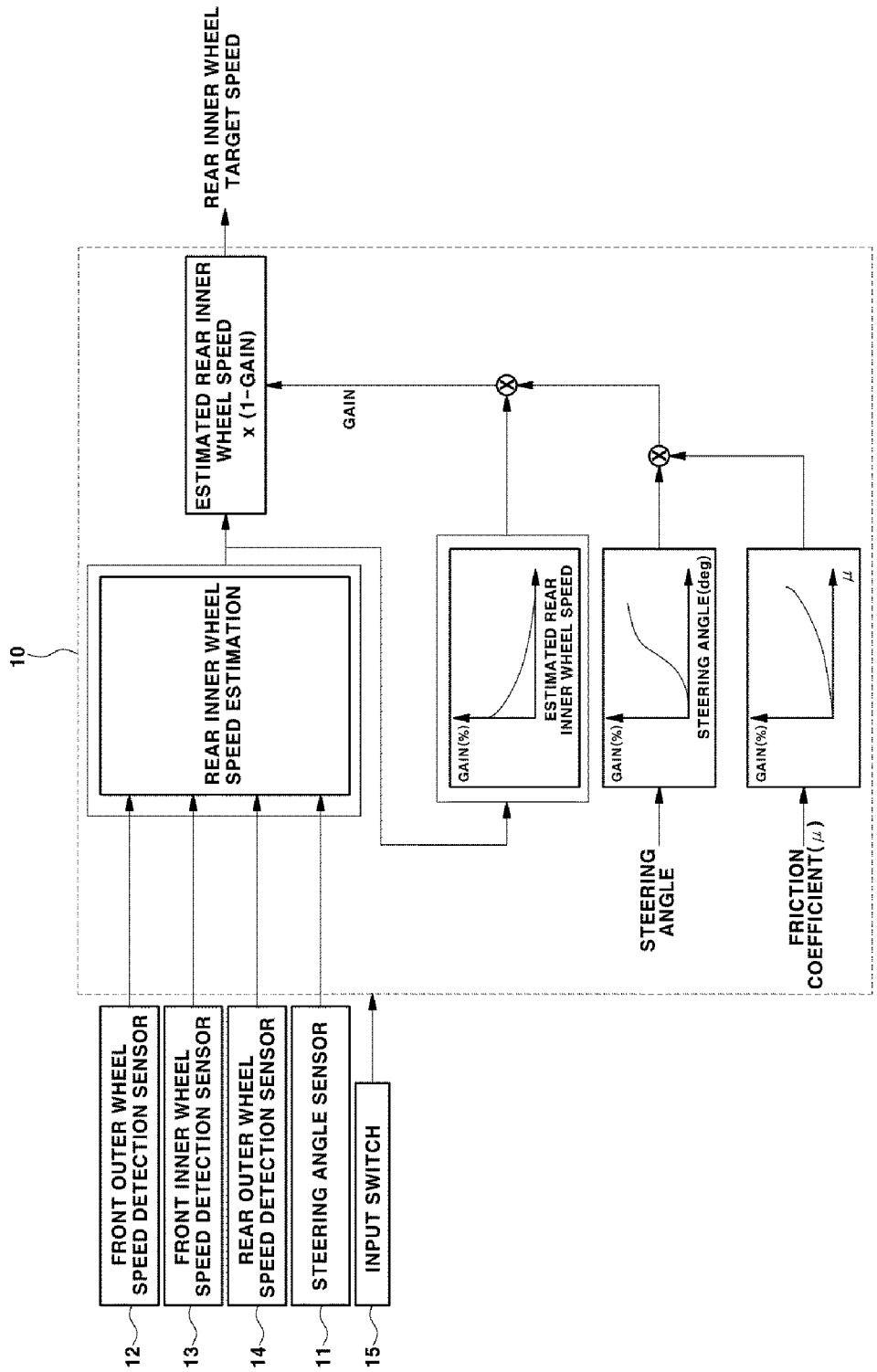
FIG. 3 is a schematic diagram illustrating control of a rear internal wheel speed in a turning direction when a vehicle turns according to an exemplary embodiment of the present invention.

FIG. 2 is a flowchart illustrating a method of controlling turning of a vehicle according to an exemplary embodiment of the present invention, and FIG. 3 is a schematic diagram illustrating control of a rear internal wheel speed in a turning direction when a vehicle turns according to an exemplary embodiment of the present invention.

First, the braking controller 10 determines whether the input switch 15 is turned on by the user (S101).

Subsequently, when the detection signal of the steering angle detection sensor 11 is transmitted to the braking controller 10 in a state in which the input switch 15 is turned on, the braking controller 10 determines whether a current steering angle exceeds a reference steering angle for reducing a minimum rotation radius (S102).

Subsequently, if the current steering angle exceeds the reference steering angle, the braking controller 10 determines whether a current vehicle speed is less than a reference speed for reducing the minimum rotation radius (S103).

At the instant time, the braking controller 10 determines the current vehicle speed based on any one of the detection signals of the front internal wheel speed detection sensor 12, the front external wheel speed detection sensor 13 and the rear external wheel speed detection sensor 14 in the turning direction thereof.

Since the rear internal wheel in the turning direction of the vehicle corresponds to a speed control object for reduction of the minimum rotation radius, when the current vehicle speed is determined at the time of turning, the braking controller 10 determines the current vehicle speed based on any one of the detection signals of the front internal wheel speed detection sensor 12, the front external wheel speed detection sensor 13 and the rear external wheel speed detection sensor 14 in the turning direction thereof, in a state of excluding the detection signal of the rear internal wheel speed detection sensor in the turning direction thereof.

For example, since the rear internal wheel (the rear left wheel) in the turning direction when the vehicle turns to the left corresponds to a speed control object for reduction of the minimum rotation radius and the rear internal wheel (the rear right wheel) in the turning direction when the vehicle turns to the right corresponds to a speed control object for reduction of the minimum rotation radius, when the current vehicle speed is determined at the time of turning, the braking controller 10 determines the current vehicle speed based on any one of the detection signals of the front internal wheel speed detection sensor 12, the front external wheel speed detection sensor 13 and the rear external wheel speed detection sensor 14 in the turning direction thereof, in a state of excluding the detection signal of the rear internal wheel speed detection sensor in the turning direction thereof.

Next, if the current vehicle speed is less than the reference speed, the braking controller 10 estimates the rear internal wheel speed in the turning direction based on the detection signals of the front internal wheel speed detection sensor 12 and the front external wheel speed detection sensor 13 and the detection signal of the rear external wheel speed detection sensor 14 and then performs control for decreasing the estimated speed as compared to the rear external wheel speed (S104).

Figure 4:
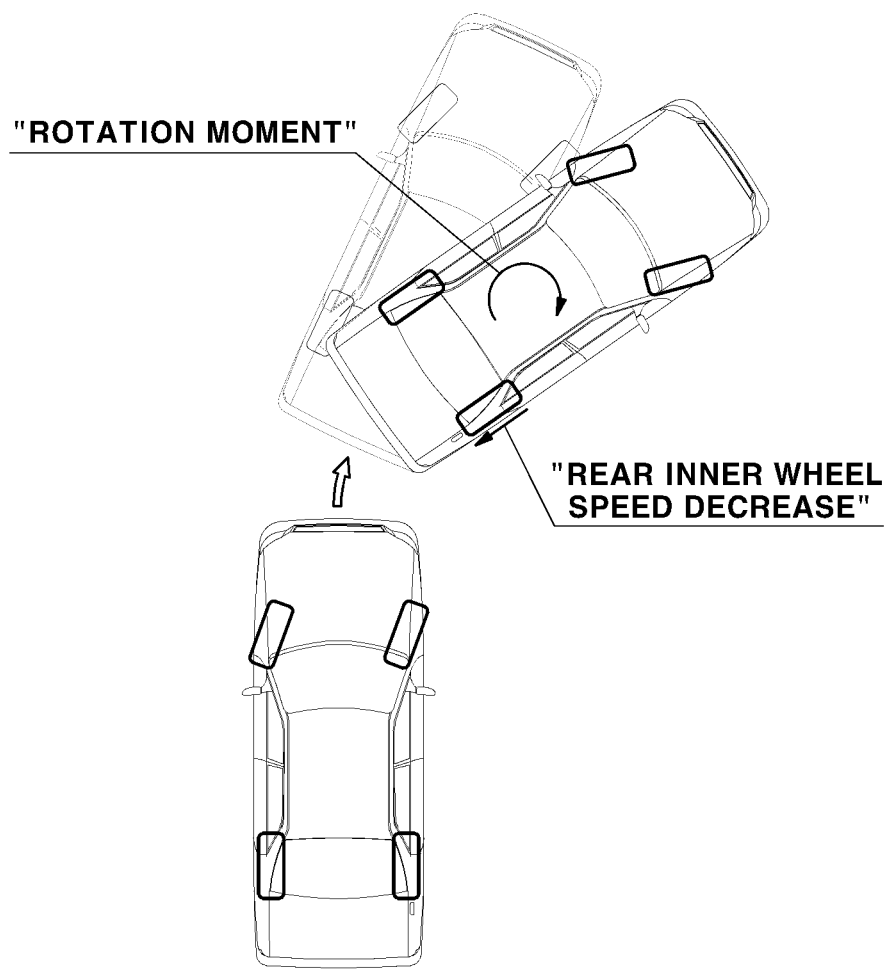
FIG. 4 is a schematic view showing turning of a vehicle according to turning control of a vehicle according to an exemplary embodiment of the present invention.

By performing control for decreasing the rear internal wheel speed in the turning direction when the vehicle turns to the left or the right, as shown in FIG. 4, the rotation moment of the turning direction of the vehicle may be generated, reducing the minimum rotation radius at the time of turning.

At the instant time, the braking controller 10 estimates the rear internal wheel speed, to control a degree of decreasing the rear internal wheel speed according to a current rear internal wheel speed, a current steering angle and a current road surface friction coefficient (μ).

The braking controller 10 estimates the rear internal wheel speed, to eliminate a sense of difference and abnormal noise caused by suddenly decreasing the rear internal wheel speed in the turning direction thereof, when steering to a neutral position after the current steering angle exceeds the reference steering angle for reduction of the minimum rotation radius, and to differentiate a deceleration control amount of the rear internal wheel in the turning direction according to the road surface conditions (e.g., a normal road surface, an icy road surface, etc.) to secure driving stability.

For example, the rear internal wheel speed in the turning direction may be estimated through the following simple formula derivation process.

Figure 5:
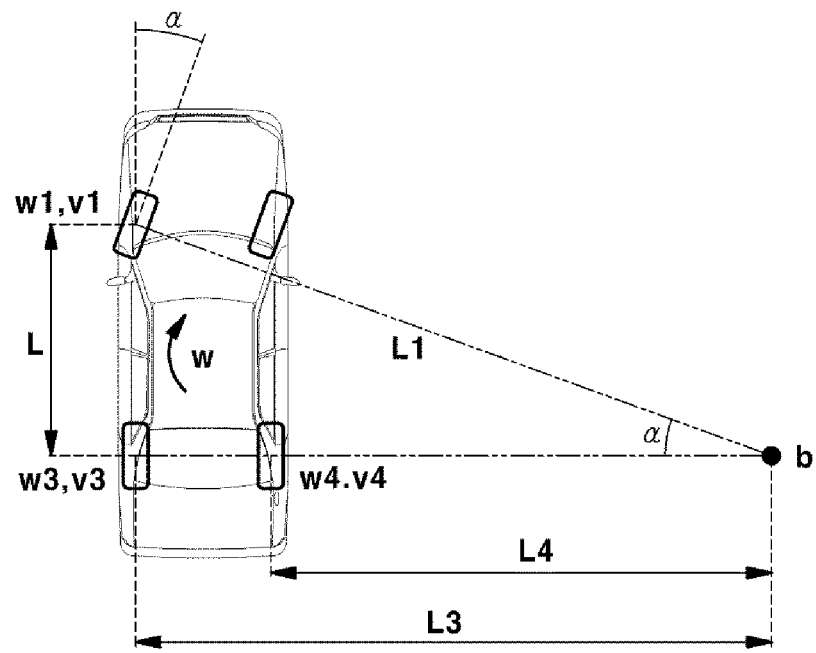
FIG. 5 is a schematic diagram illustrating simple formula derivation process of a rear internal wheel speed in a turning direction when a vehicle turns according to an exemplary embodiment of the present invention.

Referring to FIG. 5, if it is assumed that the front external wheel and the rear external wheel rotate about an arbitrary rotation point b, three wheels (the front external wheel, the rear external wheel and the rear internal wheel) have the same angular speed.

At the instant time, a length L1 between the front external wheel and the rotation point b, a length L3 between the rear external wheel and the rotation point b and a length L4 between the rear internal wheel and the rotation point b are shown in Equations 1 to 3 below.

$$L1 = \frac{L}{\sin\alpha} \qquad \text{[Equation 1]}$$

$$L3 = \frac{L}{\tan\alpha} \qquad \text{[Equation 2]}$$

$$L4 = L3 - t \qquad \text{[Equation 3]}$$

In Equations 1 to 3 above, L denotes a base wheel length between the front wheel and the rear wheel, α denotes the rotation angle of the front external wheel, and t denotes a wheel tread.

The speed v1 of the front external wheel, the speed v2 of the rear external wheel and the speed v3 of the rear internal wheel may be expressed as shown in Equations 4 to 6 below.

$$v1 = L1 \times w1 \qquad \text{[Equation 4]}$$

$$v3 = L3 \times w3 \qquad \text{[Equation 5]}$$

$$v4 = L4 \times w4 \qquad \text{[Equation 6]}$$

The position angular speed (not the rotational angular speed) of each wheel (the front external wheel, the rear external wheel or the rear internal wheel) is equal to the angular speed ω of the vehicle (ω=ω1=ω3=ω4).

However, the rear internal wheel speed v4 is unknown due to deceleration control and thus is determined using the average value of the front external wheel speed and the rear external wheel speed. The determination process thereof is shown in Equations 7 to 9 below and the rear internal wheel speed v4 may be estimated using Equation 10.

$$w4 = \frac{v1/L1 + v3/L3}{2} \qquad \text{[Equation 7]}$$

$$v4 = \frac{v1/L1 + v3/L3}{2} \times L4 \qquad \text{[Equation 8]}$$

$$v4 = \frac{v1/L1 + v3/L3}{2} \times L4 \qquad \text{[Equation 9]}$$

$$v4 = \frac{v1/(L/\sin\alpha) + v3/(L/\tan\alpha)}{2} \times (L3 - t) \qquad \text{[Equation 10]}$$

In Equation 10 above, L denotes a base wheel length between the front wheel and the rear wheel, α denotes the rotation angle of the front external wheel, and t denotes a wheel tread.

Next, as shown in FIG. 3, the braking controller 10 determines the target speed of the rear internal wheel for deceleration, by multiplying the gain value of the estimated rear internal wheel speed (e.g., a value tunable to 5 to 95% of the vehicle speed for deceleration of the rear internal wheel) in the turning direction by a steering-angle gain value indicating a compensation amount of each steering angle and a friction-coefficient gain value indicating a compensation amount of each road surface condition.

The braking controller 10 determines the target speed of the rear internal wheel for deceleration by multiplying the estimated rear internal wheel speed by (1−gain). Here the gain is obtained by multiplying the gain value of the estimated rear internal wheel speed by the steering-angle gain value and the friction-coefficient gain value.

For example, when the target speed of the rear internal wheel for controlling decrease of the rear internal wheel speed in the turning direction is determined, the target speed of the rear internal wheel decreases as the gain in (1−gain) increases.

Subsequently, the braking controller 10 controls the brake fluid pressure applied to the braking wheel cylinder mounted in the rear internal wheel according to the determined target speed of the rear internal wheel, controlling deceleration of the rear internal wheel in the turning direction thereof, and generates the rotation moment in the turning direction of the vehicle as shown in FIG. 4, reducing the minimum rotation radius at the time of turning.

Furthermore, since the target speed of the rear internal wheel for deceleration is determined by multiplying the gain value of the rear internal wheel speed in the turning direction by the steering-angle gain value, for example, when steering to a neutral position after the current steering angle exceeds the reference steering wheel angle for reduction of the minimum rotation radius, it is possible to minimize generation of a sense of difference and abnormal noise caused by suddenly decreasing the rear internal wheel speed in the turning direction thereof.

Furthermore, since the target speed of the rear internal wheel for deceleration is determined by multiplying the gain value of the rear internal wheel speed in the turning direction by the friction-coefficient gain value according to the road surface condition in addition to the steering-angle gain value, it is possible to differentiate the deceleration control amount of the rear internal wheel in the turning direction according to the road surface conditions (e.g., a normal road surface, an icy road surface, etc.), securing driving stability.

Various aspects of the present invention provide the following effects.

First, it is possible to reduce a minimum rotation radius, by generating rotation moment of the vehicle through speed control of a rear internal tire in a turning direction when the vehicle turns, without using the existing variable rack stroke system or the existing rear wheel steering system.

Second, in the case of a high-performance vehicle using a larger diameter and width than a general vehicle, since the minimum rotation radius is reduced at the time of turning, it is possible to easily prevent interference between the tire and peripheral panel parts at the time of steering and to improve turning performance.

The present invention has been described in detail with reference to exemplary embodiments thereof. However, it will be appreciated by those skilled in the art that the present invention may be implemented in various modifications and alterations via, for example, addition, change or omission of constituent elements without departing from the principles and spirit of the present invention, and these modifications and alterations are within the scope of the present invention.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling turning of a vehicle, the system comprising:
    a steering angle detection sensor configured to detect a steering angle of the vehicle;
    a front internal wheel speed detection sensor configured to detect a speed of a front internal wheel of the vehicle;
    a front external wheel speed detection sensor configured to detect a speed of a front external wheel of the vehicle;
    a rear external wheel speed detection sensor configured to detect a speed of a rear external wheel of the vehicle, wherein the rear external wheel is further externally located than a rear internal wheel based on a turning direction of the vehicle; and
    a braking controller connected to the steering angle detection sensor, the front internal wheel speed detection sensor, the front external wheel speed detection sensor, and the rear external wheel speed detection sensor, and configured to receive a detected value of the steering angle from the steering angle detection sensor to determine that the vehicle turns along the turning direction, to estimate a speed of the rear internal wheel in the turning direction based on at least one detected value among the speeds received from the front internal wheel speed detection sensor, the front external wheel speed detection sensor, and the rear external wheel speed detection sensor, and to execute a mode for decreasing an estimated speed of the rear internal wheel as compared to the speed of the rear external wheel, as a control mode for reducing a minimum rotation radius of the vehicle at a time of the turning,
    wherein the braking controller is configured to decrease the estimated speed of the rear internal wheel in the turning direction to a target speed determined by multiplying the estimated speed of the rear internal wheel by an equation of (1−a first gain value), and
    wherein the first gain value is determined by multiplying a second gain value of the estimated speed of the rear internal wheel in the turning direction by a steering-angle gain value indicating a compensation amount of the steering angle.

2. The system of claim 1,
wherein the braking controller is connected to an input switch operable by a user to transmit a signal, and
wherein the control mode for reducing the minimum rotation radius of the braking controller is executed when the input switch is turned on and the braking controller receives the signal of the input switch.

3. The system of claim 1,
wherein the braking controller is configured to determine when a current steering angle of the vehicle exceeds a reference steering angle for reducing the minimum rotation radius,
wherein when the current steering angle exceeds the reference steering angle, the braking controller is configured to determine when a current vehicle speed is less than a reference speed for reducing the minimum rotation radius, and
wherein when the current vehicle speed is less than the reference speed, the braking controller is configured to estimate the speed of the rear internal wheel of the vehicle.

4. The system of claim 3, wherein the current vehicle speed is determined based on at least one of the speeds of the front internal wheel, the front external wheel, and the rear external wheel speed.

5. The system of claim 1, wherein the first gain value is determined by multiplying the first gain value of the estimated speed of the rear internal wheel in the turning direction by a friction-coefficient gain value indicating a compensation amount of road surface condition and a steering-angle gain value indicating a compensation amount of the steering angle.

6. The system of claim 1, wherein the braking controller is configured to control brake fluid pressure applied to a braking wheel cylinder mounted in the rear internal wheel according to a determined target speed.

7. A method of controlling turning of a vehicle, the method comprising:
receiving, by a braking controller, a detected value of a steering angle of the vehicle from a steering angle detection sensor, wherein the braking controller is configured to determine when a current steering angle of the vehicle exceeds a reference steering angle for reducing a minimum rotation radius;
when the current steering angle exceeds the reference steering angle, determining, by the braking controller, when a current vehicle speed is less than a reference speed for reducing the minimum rotation radius; and
when the current vehicle speed is less than the reference speed, estimating, by the braking controller, a speed of a rear internal wheel of the vehicle in a turning direction of the vehicle based on detected values of speeds received from a front internal wheel speed detection sensor, a front external wheel speed detection sensor and a rear external wheel speed detection sensor and then controlling, by the braking controller, decrease of an estimated speed of the rear internal wheel as compared to the speed of the rear external wheel,
wherein the braking controller is configured to decrease the estimated speed of the rear internal wheel in the turning direction to a target speed determined by multiplying the estimated speed of the rear internal wheel by an equation of (1−a first gain value), and
wherein the first gain value is determined by multiplying a second gain value of the estimated speed of the rear internal wheel in the turning direction by a steering-angle gain value indicating a compensation amount of the steering angle.

8. The method of claim 7, wherein the current vehicle speed is obtained by at least one of the detected values of the speeds received from the front internal wheel speed detection sensor, the front external wheel speed detection sensor and the rear external wheel speed detection sensor.

9. The method of claim 7, wherein the first gain value is determined by multiplying the first gain value of the estimated speed of the rear internal wheel in the turning direction by a friction-coefficient gain value indicating a compensation amount of road surface condition and a steering-angle gain value indicating a compensation amount of the steering angle.

10. The method of claim 7, wherein the controlling of the decrease of the estimated speed of the rear internal wheel in the turning direction includes controlling, by the braking controller, brake fluid pressure applied to a braking wheel cylinder mounted in the rear internal wheel according to a determined target speed.

11. A system for controlling turning of a vehicle, the system comprising:
a steering angle detection sensor configured to detect a steering angle of the vehicle;
a front internal wheel speed detection sensor configured to detect a speed of a front internal wheel of the vehicle;
a front external wheel speed detection sensor configured to detect a speed of a front external wheel of the vehicle;
a rear external wheel speed detection sensor configured to detect a speed of a rear external wheel of the vehicle, wherein the rear external wheel is further externally located than a rear internal wheel based on a turning direction of the vehicle; and
a braking controller connected to the steering angle detection sensor, the front internal wheel speed detection sensor, the front external wheel speed detection sensor, and the rear external wheel speed detection sensor, and configured to receive a detected value of the steering angle from the steering angle detection sensor to determine that the vehicle turns along the turning direction, to estimate a speed of the rear internal wheel in the turning direction based on at least one detected value among the speeds received from the front internal wheel speed detection sensor, the front external wheel speed detection sensor, and the rear external wheel speed detection sensor such that the braking controller estimates the rear internal wheel speed, to control a degree of decreasing the rear internal wheel speed according to a current rear internal wheel speed, a current steering angle and a current road surface friction coefficient ($\mu$), and to execute a mode for decreasing an estimated speed of the rear internal wheel as compared to the speed of the rear external wheel, as a control mode for reducing a minimum rotation radius of the vehicle at a time of the turning.

* * * * *